(12) United States Patent
Chua

(10) Patent No.: US 8,922,489 B2
(45) Date of Patent: Dec. 30, 2014

(54) TEXT INPUT USING KEY AND GESTURE INFORMATION

(75) Inventor: Fei Chua, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 563 days.

(21) Appl. No.: 13/070,564

(22) Filed: Mar. 24, 2011

(65) Prior Publication Data

US 2012/0242579 A1 Sep. 27, 2012

(51) Int. Cl.
*G06F 3/02* (2006.01)
*G06F 3/041* (2006.01)
*G06F 3/0488* (2013.01)

(52) U.S. Cl.
CPC ........ *G06F 3/04886* (2013.01); *G06F 3/04883* (2013.01)
USPC ............ 345/168; 345/173; 715/773; 715/863

(58) Field of Classification Search
CPC ............ G06F 3/04883; G06F 3/04886; G06F 2203/04807; G06F 3/0482; G06F 1/1626; G06F 3/0233; G06F 3/017
USPC ........... 345/168–169, 173; 715/773, 863–864
See application file for complete search history.

(56) References Cited

U.S. PATENT DOCUMENTS

| | | | | |
|---|---|---|---|---|
| 5,832,113 A | * | 11/1998 | Sano | .............................. 382/187 |
| 6,094,197 A | * | 7/2000 | Buxton et al. | ................. 715/863 |
| 7,365,737 B2 | | 4/2008 | Marvit et al. | |
| 8,106,890 B2 | * | 1/2012 | Do et al. | ......................... 345/173 |
| 2005/0146508 A1 | * | 7/2005 | Kirkland et al. | .............. 345/169 |
| 2006/0119582 A1 | * | 6/2006 | Ng et al. | ......................... 345/168 |
| 2007/0075978 A1 | * | 4/2007 | Chung | ........................... 345/173 |
| 2008/0189030 A1 | * | 8/2008 | Aoki | .............................. 701/201 |
| 2009/0055771 A1 | * | 2/2009 | Nurmi | .......................... 715/810 |
| 2010/0005428 A1 | | 1/2010 | Ikeda et al. | |
| 2010/0031200 A1 | * | 2/2010 | Chen | .............................. 715/863 |
| 2010/0066764 A1 | | 3/2010 | Refai | |
| 2010/0214267 A1 | | 8/2010 | Radivojevic et al. | |
| 2010/0241984 A1 | * | 9/2010 | Nurmi et al. | ................... 715/773 |
| 2011/0063231 A1 | * | 3/2011 | Jakobs et al. | .................. 345/173 |

OTHER PUBLICATIONS

Gao, et al., "Yet another User Input Method: Accelerometer Assisted Single Key Input", Retrieved at<< http://www.cs.mtu.edu/~chgao/YAUIM.pdf >>, The 8th World Congress on Intelligent Control and Automation IEEE, Jul. 6-9, 2010, 6 pages.

(Continued)

*Primary Examiner* — Hong Zhou
(74) *Attorney, Agent, or Firm* — Steven Spellman; Jim Ross; Micky Minhas

(57) ABSTRACT

Text input may be identified from a combination of key stroke information and handwriting gesture information. In one example, a touch screen displays an on-screen keyboard. A user then draws a character on the keyboard over the key that represents the character. In this way, two types of information are provided that identify the character that the user intended to enter: the particular drawing gesture that the user provided, and the location on the keyboard at which the user drew that gesture. These two pieces of information may be used, in combination, to determine which character the user intended to enter, and may help to interpret the input accurately in the case where either the gesture or key information, individually, would have been ambiguous.

20 Claims, 4 Drawing Sheets

(56) References Cited

OTHER PUBLICATIONS

Ganapati, Priya, "How T9 Predictive Text Input Changed Mobile Phones", Retrieved at<< http://www.wired.com/gadgetlab/2010/09/martin-king-t9-dies/ >>, Sep. 23, 2010, 5 pages.

"What is Swype?", Retrieved at<< http://swypeinc.com/product.html >>, dated Sep. 11, 2008, 1 page.

"Nokia Patent: Mobile device with virtual Keyboard", Retrieved at << http://symbianwebblog.wordpress.com/2008/01/23/nokia-patent-mobile-device-with-virtual-keyboard/ >>, dated Jan. 23, 2008, 4 pages.

"Samsung Epic 4G Android Phone (Sprint)", Retrieved at <<http://www.samsungepic4gandroidphone.info/>>,—Retrieved Date: Jan. 13, 2011, 7 pages.

"Google Gesture Search", Retrieved at << http://gesturesearch.googlelabs.com/ >>, dated 2010, 1 page.

* cited by examiner

TEXT INPUT USING KEY AND GESTURE INFORMATION

BACKGROUND

There are various ways to input text on a device when the use of a full mechanical keyboard is not feasible or appropriate. For example, wireless telephones typically allow users to enter text on a keypad using the multi-tap method, or using a predictive text technology such as T9. Devices with touch screens may use handwriting recognition, or may provide an on-screen keyboard. Devices with microphones may provide speech-to-text capability.

While these techniques may allow a device to receive text input, they may be suboptimal in some situations. Entering text by these methods may produce inaccuracies, may be slow to use, or may have a steep learning curve.

SUMMARY

Input of text may be performed by a combination of position and gesture. This combination provides an input system with two pieces of information about what text a user is trying to enter, thereby helping the input system to discern the user's intent with relatively little ambiguity.

In order to receive input, a device with a touch screen may provide an on-screen keyboard. A user may then use a finger or stylus to gesture, on the touch screen, the character that he or she wants to enter. The user may draw the character over (or near) the corresponding key on the on-screen keyboard. The input system then has two pieces of information about what character the user is trying to specify: the gesture itself, and the location at which the gesture is drawn. To the extent that the gesture itself may be ambiguous, the location may help the input system to disambiguate the gesture. Likewise, to the extent that the location that the user touched on the on-screen keyboard is ambiguous, the gesture may help the input system to disambiguate the location.

An input system may be incorporated into a particular device that may receive text input from a user. Examples of such devices are wireless telephones, handheld computers, point-of-sale systems, banking systems, the in-cabin display of a motor vehicle, etc.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
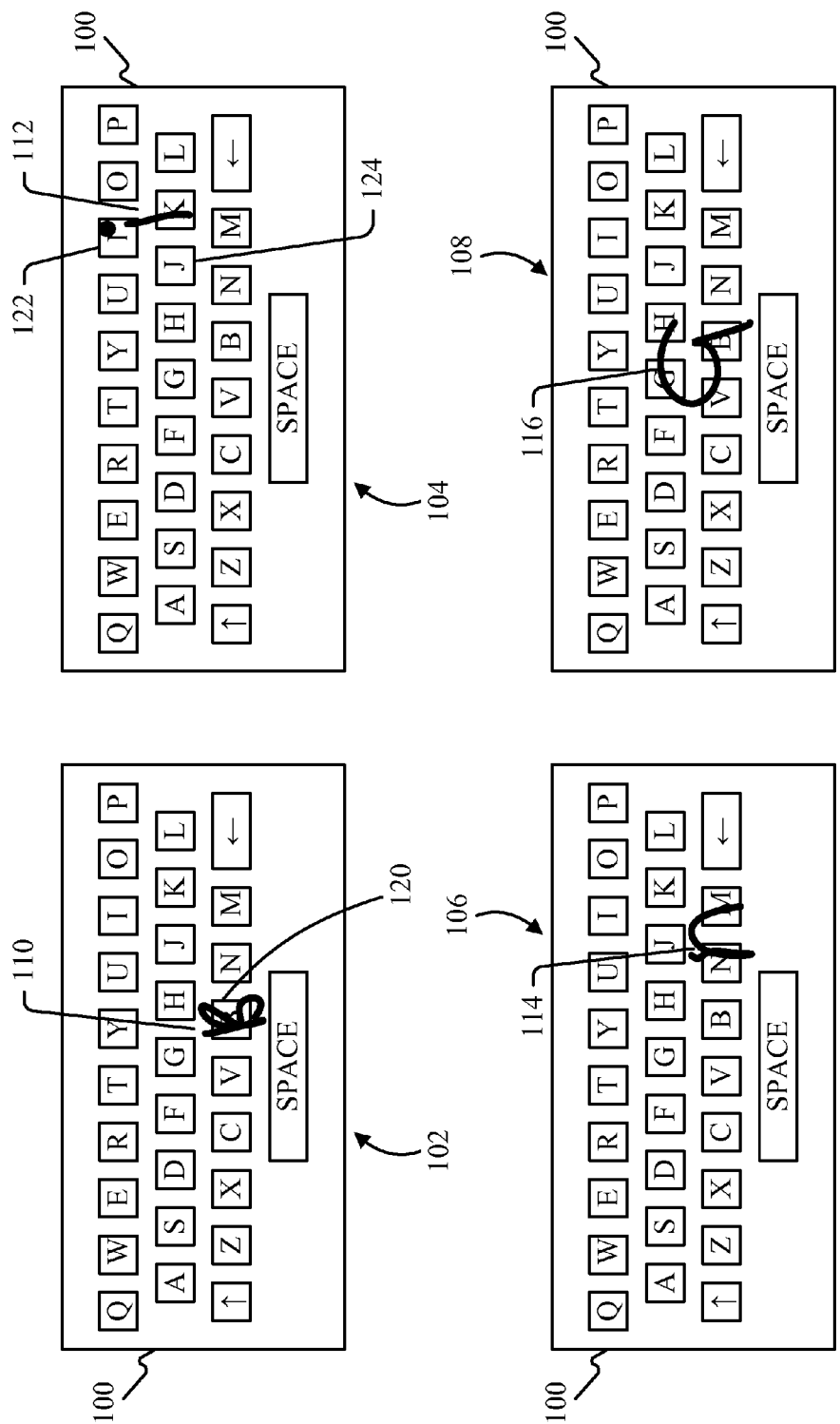
FIG. 1 is a block diagram of an example keyboard that may receive text input through both location and gestures.

Many devices receive text input from users. A relatively large device, such as a desktop or laptop computer, typically has a full-size mechanical keyboard to receive text input. However, other devices may receive input through other mechanisms. Some such mechanisms include multi-tap, predictive text, on-screen keyboards, and handwriting recognition.

For example, a wireless phone may receive text input through the keypad using multi-tap or predictive text methods. With either of these methods, each key is assigned to represent plural letters or symbols. With multi-tap, the user selects a particular letter or symbol by pressing the key some number of times in rapid succession (e.g., if the "2" key on a keypad represents letters A, B, and C, then pressing the key twice corresponds to choosing the letter B). With a predictive text system such as T9, particular sequences of keys are associated with one or more words. If a sequence resolves to a single word, then the predictive text system interprets the sequence as being that word; otherwise, the user may scroll through a choice of possible words represented by the sequence.

As another example, a wireless phone, handheld computer, or tablet computer may have a touch screen, and may use the touch screen to receive text input. One way to receive text input through a touch screen is to allow the user to draw (or "gesture") on the screen in the shape of letters (where the letter may be either in a standard alphabet, or in an alphabet specifically designed for touch-screen gestures, such as Graffiti). Another way to receive input on a touch screen is through an on-screen keyboard.

These methods all have their drawbacks. Entering text on a 9-key numeric keypad through multi-tap or predictive text may be tedious and slow, and may lead to inaccuracies. Handwriting recognition systems may have inaccuracies in the way that they recognize characters. On-screen keyboard also may receive input inaccurately.

The subject matter herein provides a way to recognize text input that combines features from other input methods in a way that may provide both accuracy and convenience. In order to receive text input, a device may provide an on-screen keyboard on a touch screen. For each character that the user wants to enter, the user may draw the character on the screen. However, instead of drawing the character in an arbitrary place on the screen, the user may draw the character over (or in the vicinity of) the keyboard symbol corresponding to that character. For example, if the user wants to write the letter "O", the user may draw the symbol for that letter (in English print, in English script, in Graffiti, etc.) over the virtual "O" key on the on-screen keyboard.

This input event provides an input system with two pieces of information, which the system may use to determine which character the user is attempting to write. One piece of information is the gesture that is drawn on the screen; the other piece of information is the location on the on-screen keyboard at which that gesture is drawn. To the extent that one piece of information is ambiguous, the other piece of information may help to disambiguate the user's intent. For example, on a QWERTY keyboard the "O" key is near the "I", "P", and "L" keys, so when the user touches the screen near the virtual "O" key, the location does not unambiguously identify a particular key; the user might have intended to press the "O" key, but also might have intended to press one of the nearby keys. However, the gesture for "O" does not look like the gesture for "I", "P", or "L", so the gesture helps to disambiguate the location as indicating an "O". On the other hand, the gesture for an "O" may look like the gesture for a "Q", in which case the gesture itself could be ambiguous. However, "O" and "Q" are not near each other on the QWERTY keyboard, so the location of the gesture may help to disambiguate the gesture. Thus, the two pieces of information together may lead to a more reliable conclusion about the character that the user is attempting to enter than could be drawn from either piece of information alone. Being able to form a conclusion about the user's intent more reliably may lead to greater accuracy in text input.

While users normally provide input to an on-screen keyboard by tapping on the virtual key, there is a system called Swype that allow a user to indicate characters by moving from key to key in an on-screen keyboard in a sliding motion rather than using discrete taps on each key. However, in Swype the sliding motion across the screen is not a gesture used to draw a character. The sliding motion merely substitutes for the repositioning of the user's finger that would otherwise take place away from the screen if the user were typing with the normal tapping motion. The sliding motion in Swype is not an attempt to draw the letter; the only information that the sliding motion provides about which characters the user is indicating is the particular set of keys that the finger slides over, which is the same information that would be provided by tapping alone.

Moreover, there are some systems that allow a user to indicate which key is being pressed through a non-tapping motion. However, such systems may be directed to allowing a user to indicate keys (either mechanical keys or virtual on-screen keys) without making physical contact with the keypad. E.g., the system might use a camera or accelerometer to detect which key the user is pressing without the user's having to make physical contact with the on-screen or mechanical keypad. Such a system, again, relies entirely on its perception of which key the user is pressing, without the user's attempting to draw the character that corresponds to that key.

Turning now to the drawings, FIG. 1 shows an example keyboard that may receive text input through both location and gestures. In the example shown, a user is typing the word "BING" on a keyboard 100. In one example, keyboard 100 may be an on-screen keyboard displayed on a touch screen. FIG. 1 shows keyboard 100 in four views, where each view demonstrates what would be gestured on keyboard 100 to enter a particular letter of the word "BING".

In view 102, the user enters the letter "B" by drawing a letter "B" over the virtual key 120 that corresponds to the letter "B". Gesture 110 is the user's drawing of the letter "B". That gesture could take any form—e.g., the print version of a capital or lowercase "B", the script version of a capital or lowercase "B", the Graffiti version of a "B", etc.

After the "B" is entered, the user next enters the "I", as shown in view 104. In view 104, the user draws a gesture 112 (which, in this case, is a lowercase print "i") near the key 122 that corresponds to the letter "I". In view 104, it will be observed that the user's placement of the "i" does not exactly correspond to key "I" key; it straddles the "I" and "K" keys (with the "K" key being key 124 in FIG. 1). However, if an input system determines that the gesture resembles an "I" more than a "K", then it may disambiguate the combination of gesture 112 and its placement over the "I" and "K" keys by concluding that the user entered an "I".

In view 106, the user enters the "N" by drawing an "n" (gesture 114) over the "N" key. It will be observed that the user, in this example, has drawn gesture 114 is over both the "M" and "N" keys. However, the user's intent can be disambiguated by determining whether the gesture looks more like an "M" or an "N".

In view 108, the user enters the "G" by drawing a "G" (gesture 116). In view 108, gesture 116 is drawn over the keys "G", "H", "V", and "B", and the input system may disambiguate the user's intent by determining whether gesture 116 looks more like a "G", an "H", a "V", or a "B". It will be observed that, if the user had simply tapped the keys "G", "H", "V", and "B" at the same time with a large finger, it would be difficult to know which character the user had intended to enter. However, since the user concurrently indicates a key on keyboard 100 (by the particular location on keyboard 100 at which the user chooses to draw the gesture), and also indicates a particular character through the gesture itself, an input system has two pieces of information that it may use to resolve the user's intent. In this way, an input system may accurately determine which character the user intended to enter.

Figure 2:
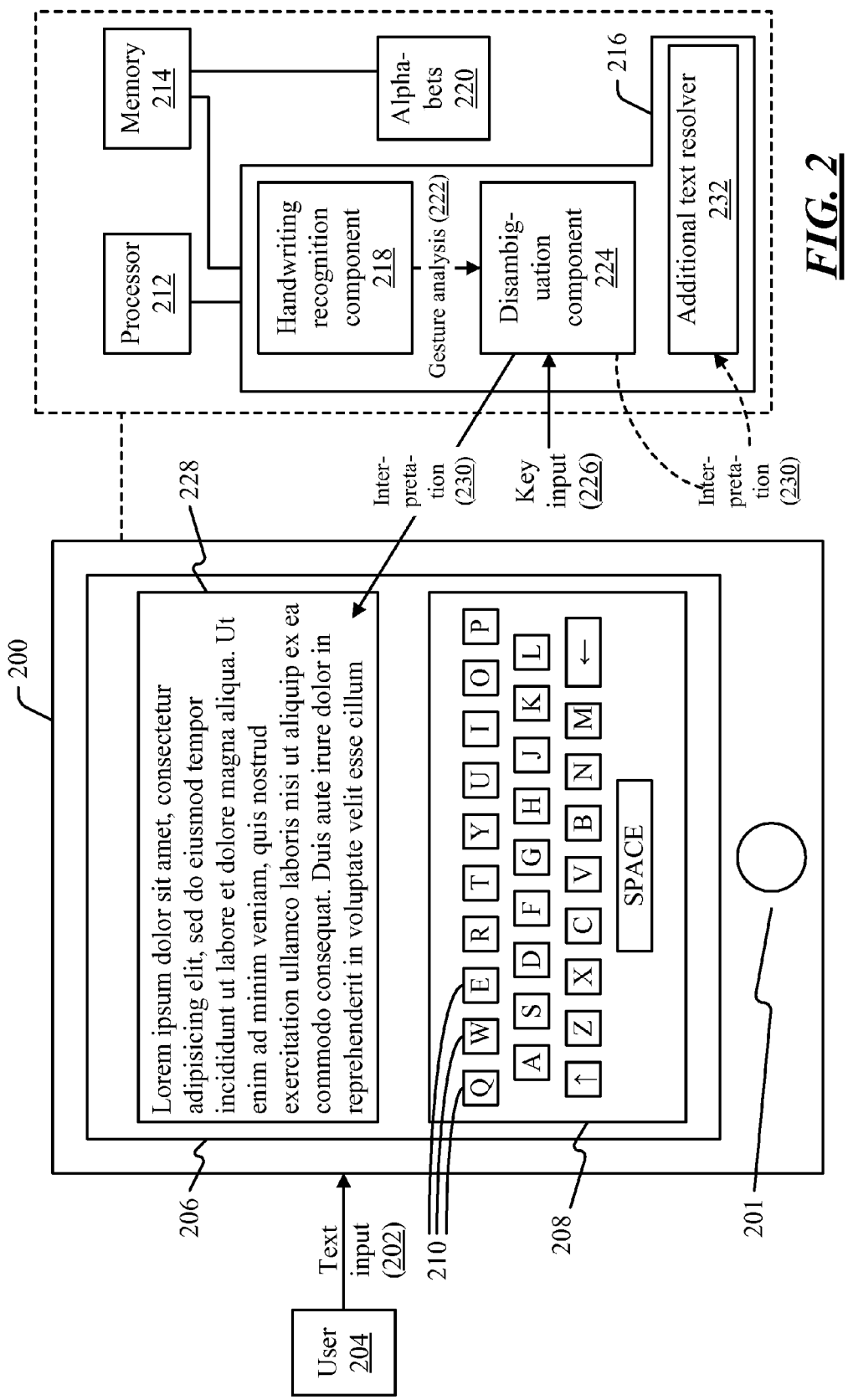
FIG. 2 is a block diagram of an example device that may receive input using the techniques described herein.

FIG. 2 shows an example device that may receive input using the techniques described herein. Device 200 is a device that can receive text input 202 from a user 204. Device 200 could be any appropriate type of device. Examples of device 200 include: a wireless telephone, a desktop or laptop computer, a handheld computer and/or music player, a tablet computer, a cash register or other point-of-sale device, and a motor vehicle and/or a user interface thereof, which the user could use while safely parked. (In the latter case, the device could be a dashboard-mounted touch display in the vehicle, or an interface that has a display in the dashboard and provides the keypad in the steering wheel—e.g., the steering wheel might have another touch screen in it in order to display an on screen keyboard where the user can reach it while parked). The foregoing is merely a list of examples of device 200, and it will be understood that other types of devices are within the scope of the subject matter herein.

Device 200 may have a touch screen 206, which both displays output of device 200 and receives input for device 200. One thing that could be displayed on touch screen 206 is on-screen keyboard 208. On-screen keyboard 208 has a plurality of virtual keys 210, which are images of keys that are reminiscent of those on a mechanical keyboard or keypad. In the example shown in FIG. 2, keyboard 208 has keys 210 arranged in a QWERTY arrangement, although keys 210 could be arranged in any manner. Touch screen 206 is able to sense the location(s) where user 204 has touched the surface of the screen. Software in device 200 knows the locations of keys 210 on touch screen. Therefore, using the known locations of the keys and sensory input about what part of the screen the user has touched, it is possible to assess which key the user has pressed. (Device 200 may also have an input button 201, as is common for certain models of wireless telephone.)

Device 200 may have a processor 212 and a memory 214. Processor 212 may be a microprocessor such as a central processing unit (CPU), a graphics processing unit (CPU), or any other component that is capable of performing some type of computation. Memory 214 may be a component that is capable of storing data, such as a volatile random access memory (RAM), a flash memory, or any other type of memory. Device 200 may have one or more executable components 216, which may be stored in memory 214 and which may execute on processor 212.

One example executable component is handwriting recognition component 218. Handwriting recognition component 218 may receive data that represents the physical gestures that the user has drawn on a touch screen. The data may represent both spatial and temporal information about how the user has touched the screen and/or how the user has moved a finger or stylus across the screen. One or more alphabets 220 may be stored in memory 214 (or may be stored in another component). Alphabets 220 contain representations of characters in various forms, such as English print, English script, Graffiti, etc. Handwriting recognition component 218 may use alphabets 220 to identify the character that is represented by input from a touch screen. Handwriting recognition component 218 may identify a particular piece of input as representing a particular single character (e.g., the character in alphabets 220 that is the closest match to the input). Or, in another example, handwriting recognition component 218 may provide several possible matches and/or a set of probabilities that each character is the match for the input. Either the single identified character, or the list of plural characters and their respective probabilities of matching the input, may be produced as output by handwriting recognition component 218. This output is referred to in FIG. 2 as gesture analysis 222.

Another example executable component is disambiguation component 224. Disambiguation component 224 receives information about the handwriting gesture that the user has made and the key(s) that the user pressed, and attempts to disambiguate this information to make a determination of what character the user entered. In order to make this determination, disambiguation component 224 may receive gesture analysis 222, and may also receive key input 226. In one example, key input 226 may be an indication of a particular key that the user tapped (or that the user drew a character on top of). In another example, key input 226 may be a plurality of keys that the user tapped or drew a character on top of. For example, with reference to FIG. 1, in view 108 the user has drawn a "G" on top of the four keys "G", "H", "V", and "B". In one example, a system may attempt to choose one a single one of these keys (e.g., "G"), in which case key input 226 contains an indication of a single key. Or, in another example, the system may report that all four keys were touched, in which case key input 226 may contain indications of all four keys (possibly accompanied by the respective probabilities that each of the keys is the true key that the user intended to indicate).

Disambiguation component 224 uses gesture analysis 222 and key input 226 to determine a particular key that will be treated as the interpretation of the user's input. Disambiguation component 224 may make this determination in any manner. For example, gesture analysis 222 might identify a single character, and key input 226 might identify the same single character. In this example, disambiguation component 224 could simply determine that the character (on which the two items of input are in agreement) is the correct interpretation of the user's input. In another example, gesture analysis 222 might identify a gesture as possibly being one of two different characters (e.g., "Q" and "O"), and key input 226 might indicate that the user has pressed keys "O" and "P". Since "O" appears both as a possible match for the gesture and a possible match for the keystroke, disambiguation component 224 may identify "O" as the interpretation of the user's input. In yet another example, gesture analysis 222 might identify a gesture as being an "M" or an "N", and key input 226 might identify both the "M" and "N" keys as having been pressed. Based on how well the input gesture matches the various symbols among alphabets 220, gesture analysis 222 might assign a 0.75 probability to the "M" and a 0.25 probability to the "N". In this case, disambiguation component 224 might choose the "M" as the proper interpretation of the user's input. The foregoing are some examples of how disambiguation component 224 could disambiguation the user's input from the gesture information and the location (key) information. However, disambiguation component 224 could perform the disambiguation in any appropriate manner.

Once disambiguation component 224 has identified the character that will be treated as the interpretation 230 of the user's input, this character may be displayed in a display area 228 of touch screen 206 (e.g., as part of an e-mail, document, text message, or some other type of information that the user is composing). Or, in another example, the interpretation 230 of input may be provided to an additional text resolver 232. Additional text resolver 232 may employ additional techniques to determine what text the user is attempting to input. For example, additional text resolver 232 may employ a spelling corrector to correct errors in the user's spelling. (E.g., analysis of the characters that the user has input might conclude, correctly, that the user typed "greatful", but additional text resolver 232 may correct this word to "grateful".) Or, additional text resolver 232 may employ a statistical language model to identify the likely text that the user was trying to input. For example, the "R" and "G" keys are close to each other on a QWERTY keyboard, so a user might enter "English gain" when he or she meant to type "English rain." If a combination of gesture and location analysis on the user's input still manages to identify the input as "English gain", a statistical language model employed by additional text resolver 232 may determine that it is highly unlikely that the word "gain" would follow the word "English", and thus may correct this sequence of words to "English rain". The foregoing are some examples of techniques that may be employed by additional text resolver 232, although any appropriate technique could be performed. If additional text resolver 232 is used, the output of additional text resolver 232 may be displayed in display area 228.

Figure 3:
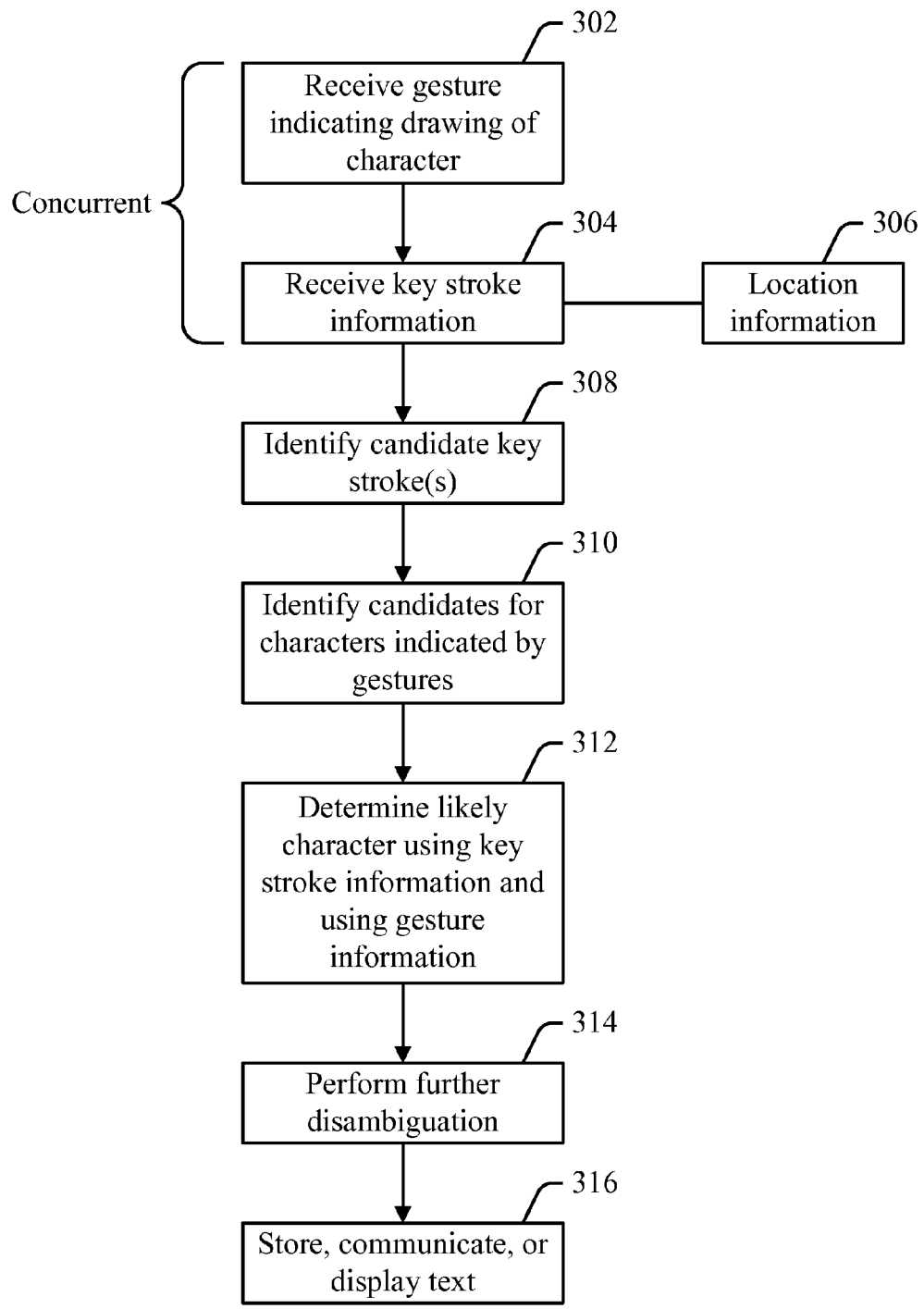
FIG. 3 is a block diagram of an example process in which user input may be interpreted as text.

FIG. 3 shows an example process in which user input may be interpreted as text. Before turning to a description of FIG. 3, it is noted that the flow diagram of FIG. 3 is described, by way of example, with reference to components shown in FIGS. 1 and 2, although this process may be carried out in any system and is not limited to the scenarios shown in FIGS. 1 and 2. Additionally, the flow diagram in FIG. 3 shows an example in which stages of a process are carried out in a particular order, as indicated by the lines connecting the blocks, but the various stages shown in this diagram may be performed in any order, or in any combination or sub-combination.

At 302, a gesture indicating the drawing of a character may be received. This gesture may be received, for example, by a device that uses a touch screen to receive input. At 304, key stroke information may be received, indicating which key on a keyboard a user has pressed (or drawn a gesture over). One type of key stroke information is location information 306, which may indicate the particular location on a touch screen at which user input has occurred, such as in the case where a virtual keyboard is displayed on the touch screen. However, key stroke information may take any form. The receipt of gesture and key stroke information at 302 and 304 may take place concurrently, as in the example where a user gestures a character on top of a particular key (or keys) of an on-screen keyboard.

At 308, candidate key strokes are identified. For example, if the user has drawn a letter over three different keys, then all three keys may be considered candidate key strokes. Similarly, keys surrounded by the user's gesture could be included as candidate keys. (E.g., a user might draw a "D" in a way that touches the surrounding keys "W", "S", "X", "Z", "C", "F", "R", and "E".) A key that is surrounded by other keys that have been touched could be considered to be a candidate key. At 310, candidates are identified that represents the possible characters indicated by the gesture. For example, if a gesture is compared with a known alphabet and matches two possible characters, then both characters might be identified as candidates at 310.

At 312, at determination is made as to what character it is likely the user was attempting to enter. This determination may be made based on the gesture information and on the keystroke information. The determination is what has been referred to elsewhere herein as the interpretation of the user input. Thus, if the user draws a gesture that could be an "O" or a "Q", and this gesture is drawn over the keys "O" and "P", then the user input may be interpreted as an "O" (since it is unlikely that the user intended to write a "Q" if the user's input was detected near the "O" key and far from the "Q" key). In this case, the determination that is made at 312 is that the user's input is an "O", thereby resolving the user's input to a particular character. One possible way to determine which character the user intended to indicate on the touch screen is as follows. A system may determine the possible matches for the gesture, and may assign, to each possible match, a probability that the match is correct. Similarly, the system may determine which keys are touched by the gesture and may assign, to each such key, a probability that the key is the one that the user intended to draw the gesture over. The system may then calculated weighted averages of these probabilities and may identify the user's intended input character as being the one with the highest weighted average. However, the foregoing is merely one, non-limiting way to identify the character that the user intended to indicate.

At 314, further disambiguation of the user input may be performed. For example, the actions performed by additional text resolver 232, as described above in connection with FIG. 2, may be performed at 314.

At 316, the text that the user has been determined to have entered may be stored, communicated, or displayed. For example, the text may be stored in a memory or storage device, or the text may be communicated to a person, or the text may be displayed on a display device.

Figure 4:
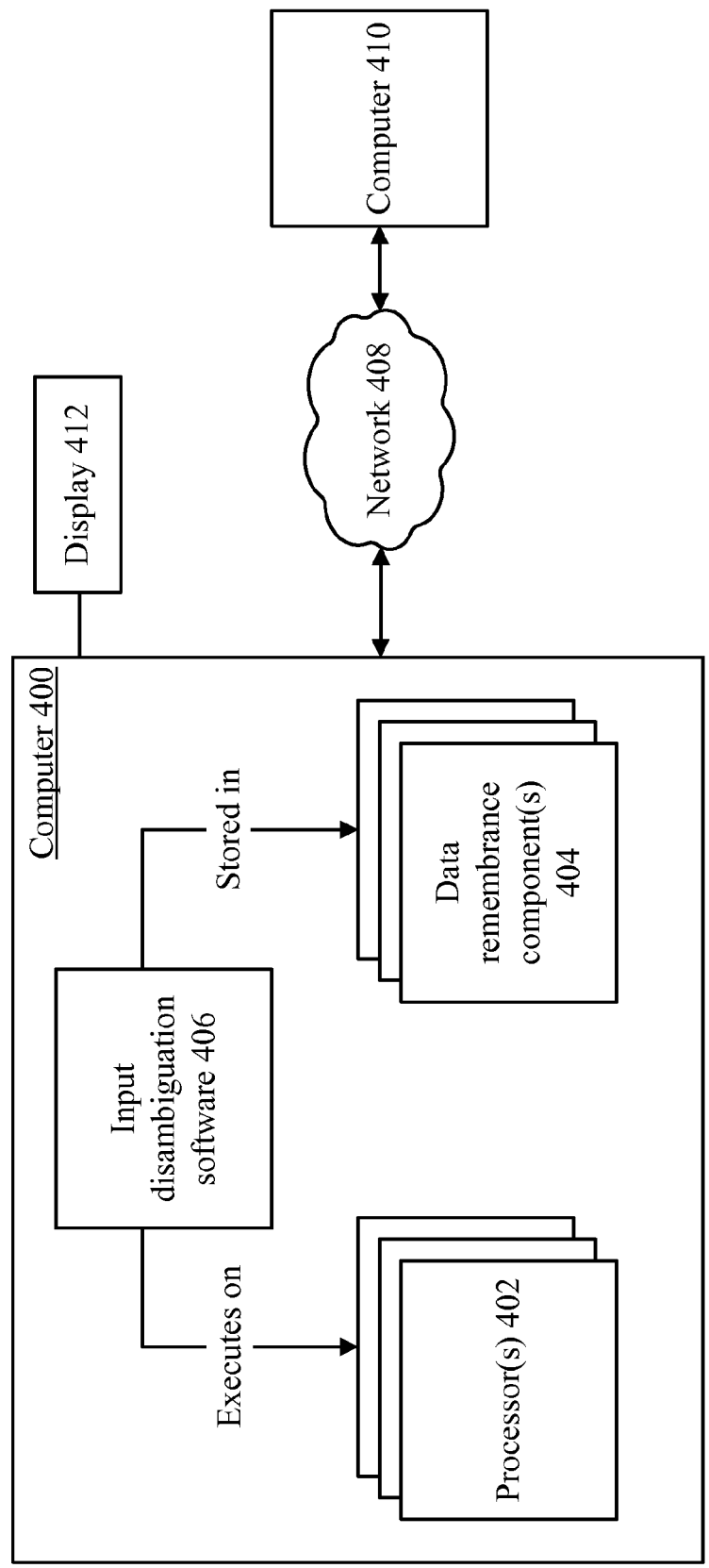
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, etc. Data remembrance component(s) are examples of computer-readable (or device-readable) storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is input disambiguation software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer and/or device (e.g., personal computer, server computer, handheld computer, tablet computer, wireless telephone, etc.) in which a program is stored on hard disk, loaded into RAM, and executed on the computer's processor(s) (or, more generally, on a device's processor) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable (or device-readable) storage media. Tangible media, such as an optical disks or magnetic disks, are examples of storage media. The instructions may exist on non-transitory media. Such instructions, when executed by a computer or other machine, may cause the computer (or other machine or device) to perform one or more acts of a method. The instructions to perform the acts could be stored on one medium, or could be spread out across plural media, so that the instructions might appear collectively on the one or more computer-readable (or device-readable) storage media, regardless of whether all of the instructions happen to be on the same medium. It is noted that there is a distinction between media on which signals are "stored" (which may be referred to as "storage media"), and—in contradistinction—media that transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more device-readable storage media that store executable instructions to receive text input, wherein the executable instructions, when executed on a device, cause the device to perform acts comprising:

receiving a gesture drawn by a user on a touch screen on which an on-screen keyboard is being displayed at a time at which the gesture is drawn;

identifying a character represented by the gesture; said gesture comprising a shape of said character;

identifying a key over which the gesture is drawn;

determining that the user entered the character based on the gesture and also based on the key;

identifying one or more characters that correspond to the gesture, wherein each of the one or more characters is associated with a probability that it corresponds to the gesture;

identifying one or more keys over which the gesture is drawn, wherein each of the one or more keys is associated with a probability that it is the key that the user intended to indicate;

using a weighted average of probabilities associated with the characters and probabilities associated with the keys to determine which character the user entered; and storing, communicating, or displaying the character.

2. The one or more device-readable media of claim 1, wherein identifying the one or more keys over which the gesture is performed by identifying locations on the touch screen that are touched by the gesture.

3. The one or more device-readable storage media of claim 1, wherein said acts further comprise:

identifying the one or more keys over which the gesture is drawn, wherein the one or more keys comprise said key; and using the gesture to determine which one of the one or more keys the user indicated.

4. The one or more device-readable storage media of claim 1, the one or more characters comprising said character, and where said acts further comprise:

using information on which of said one or more keys on the on-screen keyboard the gesture is drawn over to determine which one of the one or more characters the gesture represents.

5. The one or more device-readable storage media of claim 1, wherein the device comprises a wireless telephone.

6. The one or more device-readable storage media of claim 1, wherein the device comprises a tablet computer.

7. The one or more device-readable storage media of claim 1, wherein the touch screen is part of the device.

8. The one or more device-readable storage media of claim 1, said device comprising a dashboard-mounted interface of a motor vehicle.

9. A method of processing text input, the method comprising:

receiving a gesture drawn by a user on a touch screen on which an on-screen keyboard is being displayed at a time at which the gesture is drawn;

determining, based on one or more keys on the on-screen keyboard over which the gesture is drawn or that the gesture surrounds, and also based on one or more characters in an alphabet that correspond to the gesture, which character the user indicated on the touch screen, the gesture comprising a shape of said character; and storing, communicating, or displaying the character, wherein each of the one or more characters is associated with a probability that it corresponds to the gesture, wherein each of the one or more keys is associated with a probability that it is a key that the user intended to indicate, and wherein the method further comprises:

using a weighted average of probabilities associated with the characters and probabilities associated with the keys to determine which character the user entered.

10. The method of claim 9, further comprising:

identifying the one or more keys on the on-screen keyboard over which the gesture is drawn by identifying locations on the touch screen that are touched by the gesture.

11. The method of claim 9, further comprising:

using the gesture to determine which one of the one or more keys the user indicated.

12. The method of claim 9, further comprising:

using information on which one or more keys on the on-screen keyboard the gesture is drawn over to determine which one of the one or more characters the gesture represents.

13. The method of claim 9, wherein the method is performed by a device that comprises a dashboard-mounted interface of a motor vehicle, or is performed by a device that has a dashboard-mounted display and that provides a keypad in a steering wheel.

14. The method of claim 9, said method being performed by a device that Comprises a wireless telephone 15. A device for receiving text input, the device comprising:

a processor;

a memory;

a touch screen; and a component that is stored in said memory and that executes on said processor, wherein the component displays an on-screen keyboard on said touch screen, receives a gesture drawn by a user on said touch screen, identifies a character represented by the gesture, identifies a key over which the gesture is drawn, determines that the user entered the character based on the gesture and also based on the key, and either stores the character in the memory, communicates the character over a network, or displays the character on said touch screen said gesture comprising a shape of said character, wherein the component identifies one or more characters that correspond to the gesture, wherein each of the one or more characters is associated with a probability that it corresponds to the gesture, wherein the component identifies one or more keys over which the gesture is drawn, wherein each of the one or more keys is associated with a probability that it is the key that the user intended to indicate, and wherein the component uses a weighted average of probabilities associated with the characters and probabilities associated with the keys to determine which character the user entered.

16. The device of claim 15, wherein the component identifies said one or more keys over which the gesture is performed by identifying locations on the touch screen that are touched by the gesture.

17. The device of claim 15, wherein the one or more keys comprise said key, and wherein the component uses the gesture to determine which one of the one or more keys the user indicated.

18. The device of claim 15, wherein the one or more characters comprise said character, and wherein the component uses information on which of the one or more keys on the on-screen keyboard the gesture is drawn over to determine which one of the one or more characters the gesture represents.

19. The device of claim 15, wherein the device comprises a wireless telephone.

20. The device of claim 15, said device comprising a tablet computer.

* * * * *